United States Patent
Ezrielev et al.

(10) Patent No.: US 12,405,875 B2
(45) Date of Patent: Sep. 2, 2025

(54) MANAGING INTEGRATION OF NEW DATA FOR DATA PIPELINES

(71) Applicant: Dell Products L.P., Round Rock, TX (US)

(72) Inventors: Ofir Ezrielev, Beer Sheva (IL); Hanna Yehuda, Acton, MA (US); Inga Sogaard, Wichita, KS (US)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 18/343,975

(22) Filed: Jun. 29, 2023

(65) Prior Publication Data

US 2025/0004908 A1 Jan. 2, 2025

(51) Int. Cl.
*G06F 8/77* (2018.01)
*G06F 8/656* (2018.01)
*G06F 11/3604* (2025.01)

(52) U.S. Cl.
CPC .......... *G06F 11/3604* (2013.01); *G06F 8/656* (2018.02); *G06F 8/77* (2013.01)

(58) Field of Classification Search
CPC ....................................................... G06F 8/77
See application file for complete search history.

(56) References Cited

U.S. PATENT DOCUMENTS

| | | | |
|---|---|---|---|
| 7,315,805 B2 | 1/2008 | Slater | |
| 7,788,470 B1 * | 8/2010 | Purcell | G06F 9/3877 712/34 |
| 9,990,383 B2 * | 6/2018 | Brinnand | G06F 16/258 |
| 10,168,691 B2 | 1/2019 | Zornio et al. | |
| 10,936,479 B2 | 3/2021 | Maag et al. | |
| 11,101,037 B2 | 8/2021 | Allen | |
| 11,221,270 B2 | 1/2022 | Evans | |
| 11,281,453 B1 * | 3/2022 | Ramachandran | G06F 8/65 |
| 11,314,517 B2 * | 4/2022 | Keski-Valkama | G06N 20/00 |
| 11,341,605 B1 | 5/2022 | Singh | |
| 11,853,853 B1 | 12/2023 | Beauchesne et al. | |
| 12,008,046 B1 | 6/2024 | Curtis et al. | |
| 12,019,902 B2 * | 6/2024 | Haile | G06F 3/0653 |
| 12,182,098 B1 * | 12/2024 | Ezrielev | G06F 16/2365 |
| 12,216,651 B2 * | 2/2025 | Krishnan | G06F 16/2448 |

(Continued)

OTHER PUBLICATIONS

Bosch, Jan, Helena Holmström Olsson, and Tian J. Wang. "Towards automated detection of data pipeline faults." 2020 27th Asia-Pacific Software Engineering Conference (APSEC). IEEE, 2020.*

(Continued)

*Primary Examiner* — Francisco J Aponte
(74) *Attorney, Agent, or Firm* — WOMBLE BOND DICKINSON (US) LLP (57) ABSTRACT

Methods and systems for managing operation of a data pipeline are disclosed. To manage the data pipeline, a system may include one or more data sources, a data repository, and one or more downstream consumers. As new data becomes available for use in the data pipeline, the new data may be automatically evaluated for utility. The evaluation may be made through establishment of a shadow pipe. The shadow pipe may allow for comparison of operation of the data pipeline with the new data against operation of the data pipeline without the new data.

20 Claims, 8 Drawing Sheets

(56) References Cited

U.S. PATENT DOCUMENTS

| | | | |
|---|---|---|---|
| 12,242,447 B2* | 3/2025 | Ezrielev | G06F 16/217 |
| 12,242,543 B1* | 3/2025 | Pai | G06N 5/025 |
| 12,242,892 B1 | 3/2025 | Burnett | |
| 2004/0064750 A1 | 4/2004 | Conway | |
| 2006/0009881 A1 | 1/2006 | Ferber et al. | |
| 2013/0227573 A1* | 8/2013 | Morsi | G06F 9/5083 718/100 |
| 2014/0037161 A1 | 2/2014 | Rucker | |
| 2014/0136184 A1 | 5/2014 | Hatsek | |
| 2016/0098037 A1 | 4/2016 | Zornio | |
| 2016/0179063 A1* | 6/2016 | De Baynast De Septfontaines | H04L 41/0883 700/11 |
| 2017/0255460 A1* | 9/2017 | Frank | G06F 9/45558 |
| 2017/0262298 A1* | 9/2017 | Frank | G06F 8/65 |
| 2018/0052708 A1* | 2/2018 | Ganesan | G06F 9/4812 |
| 2018/0081871 A1 | 3/2018 | Williams | |
| 2019/0034430 A1 | 1/2019 | Das | |
| 2019/0236204 A1 | 8/2019 | Canim | |
| 2019/0251479 A1 | 8/2019 | Anderson et al. | |
| 2019/0361697 A1* | 11/2019 | Hu | G06F 8/433 |
| 2019/0370263 A1 | 12/2019 | Nucci | |
| 2020/0166558 A1 | 5/2020 | Weis | |
| 2020/0167224 A1 | 5/2020 | Abali | |
| 2020/0202478 A1 | 6/2020 | Thumpudi et al. | |
| 2020/0293684 A1 | 9/2020 | Harris | |
| 2020/0356428 A1* | 11/2020 | Rama | G06F 9/4494 |
| 2020/0394044 A1* | 12/2020 | Keski-Valkama | G06N 20/00 |
| 2021/0027771 A1 | 1/2021 | Hall | |
| 2021/0081836 A1* | 3/2021 | Polleri | G06F 8/77 |
| 2021/0116505 A1 | 4/2021 | Shu | |
| 2021/0117859 A1* | 4/2021 | Rogers | H04L 41/082 |
| 2021/0248165 A1* | 8/2021 | Fry | G06F 16/907 |
| 2021/0374143 A1 | 12/2021 | Neill | |
| 2021/0377286 A1 | 12/2021 | Shukla et al. | |
| 2021/0385196 A1 | 12/2021 | Rahmat | |
| 2021/0406110 A1 | 12/2021 | Vaid et al. | |
| 2022/0014584 A1* | 1/2022 | Huetter | G06F 9/4843 |
| 2022/0086175 A1 | 3/2022 | Bharrat | |
| 2022/0092234 A1 | 3/2022 | Karri | |
| 2022/0301027 A1 | 9/2022 | Basta | |
| 2022/0310276 A1 | 9/2022 | Wilkinson | |
| 2022/0374399 A1 | 11/2022 | Kementsietsidis | |
| 2023/0014438 A1 | 1/2023 | Jones | |
| 2023/0040834 A1 | 2/2023 | Haile | |
| 2023/0081880 A1* | 3/2023 | Mathur | G06F 16/2457 707/732 |
| 2023/0090398 A1 | 3/2023 | Upadhyay | |
| 2023/0126260 A1 | 4/2023 | Elsakhawy et al. | |
| 2023/0153095 A1 | 5/2023 | Rahill-Marier | |
| 2023/0196096 A1 | 6/2023 | Milne | |
| 2023/0213930 A1 | 7/2023 | Rakshit | |
| 2023/0315078 A1 | 10/2023 | Sepulveda et al. | |
| 2023/0342281 A1 | 10/2023 | Haile | |
| 2023/0418280 A1 | 12/2023 | Emery | |
| 2024/0119364 A1 | 4/2024 | Jain | |
| 2024/0126888 A1 | 4/2024 | Kalou et al. | |
| 2024/0235952 A9 | 7/2024 | Hicks | |
| 2024/0281419 A1 | 8/2024 | Alfaras | |
| 2024/0281522 A1 | 8/2024 | Kuo | |
| 2024/0330136 A1 | 10/2024 | Furlong | |
| 2024/0412104 A1 | 12/2024 | Zhang | |

OTHER PUBLICATIONS

Grafberger, Stefan, Paul Groth, and Sebastian Schelter. "Towards Interactively Improving ML Data Preparation Code via "Shadow Pipelines"." Proceedings of the Eighth Workshop on Data Management for End-to-End Machine Learning. 2024.*

Wang, Haozhe, et al., "A graph neural network-based digital twin for network slicing management," IEEE Transactions on Industrial Informatics 18.2 (2020): 1367-1376 (10 Pages).

Wang, Haozhe, et al., "A graph neural network-based digital twin for network slicing management," IEEE Transactions on Industrial Informatics 18.2 (2020): 1367-1376 (11 Pages).

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0'Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

* cited by examiner

MANAGING INTEGRATION OF NEW DATA FOR DATA PIPELINES

FIELD

Embodiments disclosed herein relate generally to data management. More particularly, embodiments disclosed herein relate to systems and methods to manage integration of new data into data pipelines.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data pipelines. Over time, new data may become available for use in the data pipeline. However, the utility of the new data in the data pipeline may not be clear from content of the data.

To ascertain the utility of the new data, an automated process for integrating use of the new data into the data pipeline may be performed. The automated process may include establishing a shadow pipe through which utility of the new data may be evaluated. A pipe may be a portion of a data pipeline. A pipe may include, for example, databases, application programming interfaces, inference models, data supplementers, and/or other components.

The shadow pipe may include, for example, inferential components that generate inferences using the data, and/or supplemental components for providing predicted values for the new data when sources of the new data are unable to supply new data. The operation of the shadow pipe may be evaluated through comparison to operation of existing production pipes.

If the shadow pipe is favorably evaluated, the shadow pipe may be integrated into the data pipeline. For example, the shadow pipe may be converted to a production pipe. In contrast to a production pipe that may be advertised and used by downstream entities, a shadow pipe may not be advertised or used by downstream entities. By converting the shadow pipe to a production pipe, downstream entities may begin to utilize the shadow pipe. For example, the shadow pipe may generate inferences consumed by downstream data consumers along the data pipeline.

By doing so, embodiments disclosed herein may reduce barriers to use of new data. For example, by automating evaluation of the utility of new data, the cognitive burden on administrators for integrating new data into data pipelines may be reduced. Consequently, the data pipelines may provide access to higher quality data.

In an embodiment, a method of managing a data pipeline is provided. The method may include identifying availability of a new parameter to the data pipeline; identifying a production pipe of the data pipeline based on the new parameter; obtaining a shadow pipe for the data pipeline based at least in part on the new parameter, and the production pipe; obtaining an evaluation of the shadow pipe; making a determination regarding whether the evaluation meets an evaluation criteria; in a first instance of the determination where the evaluation meets the evaluation criteria: updating operation of the data pipeline using the shadow pipe to obtain an updated data pipeline, and providing computer implemented services using the updated data pipeline; and in a second instance of the determination where the evaluation does not meet the evaluation criteria: terminating the shadow pipe to retain the data pipeline, and providing the computer implemented services using the data pipeline.

Identifying the production pipe may include displaying, using a graphical user interface, information regarding the new parameter to a user; and obtaining, using the graphical user interface, first user input confirming that the new parameter is relevant to the production pipe.

Obtaining the shadow pipe may include obtaining, using the graphical user interface, second user input indicating whether the new parameter is stable; obtaining, using the graphical user interface, third user input indicating whether the new parameter signifies an occurrence of data drift in the production pipe; and instantiating an inference model for the shadow pipe.

Obtaining the shadow pipe may also include, in an instance of the second user input that indicates that the parameter is not stable: instantiating a value supplementer adapted to supplement the parameter during periods of time where values for the new parameter are unavailable.

The value supplementer may be a second inference model that is trained to predict the values for the new parameter.

In a first instance of the third user input that indicates that the new parameter does not signify the occurrence of data drift, the inference model may be trained using first training data that comprises historic data that is obtained prior to the occurrence of the data drift.

In a second instance of the third user input that indicates that the new parameter does signify the occurrence of data drift, the inference model may be trained using training data that does not comprise the historic data that is obtained prior to the occurrence of the data drift.

Obtaining the evaluation of the shadow pipe may include obtaining a first inference using a first inference model of the shadow pipe and a value for the new parameter; and obtaining a first evaluation metric using at least the inference.

Making the determination may include obtaining a second evaluation metric using a second inference of the production pipe, the second inference and the first inference being predictions for a same quantity; displaying, using the graphical user interface, information regarding the first evaluation metric and the second evaluation metric to a second user; obtaining, using the graphical user interface, second user input from the second user, the second user input indicating whether the evaluation meets the evaluation criteria; and concluding whether the evaluation meets the evaluation criteria using the second user input.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Figure 1:
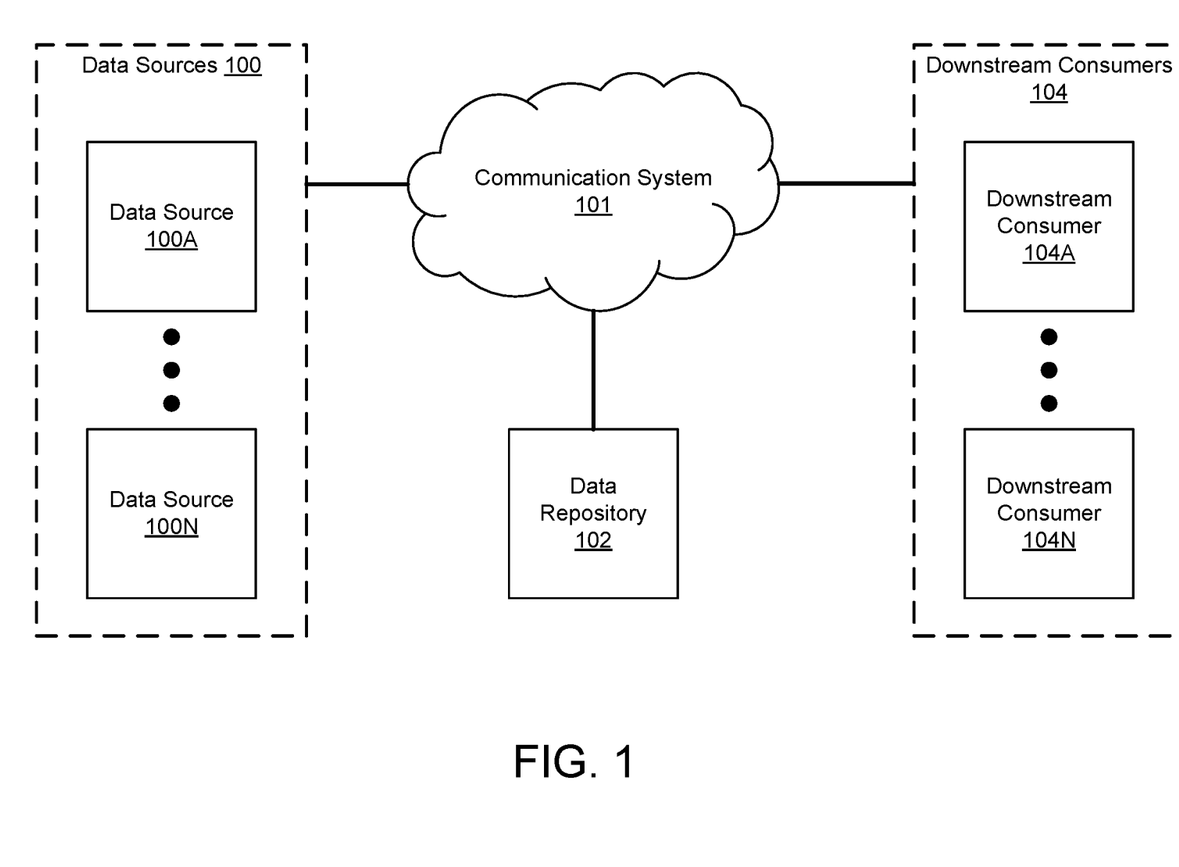
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services utilizing data obtained from any number of data sources and stored in a data repository prior to performing the computer-implemented services. The computer-implemented services may include any type and quantity of computer-implemented services. For example, the computer-implemented services may include monitoring services (e.g., of locations), communication services, and/or any other type of computer-implemented services.

To facilitate the computer-implemented services, the system may include data sources 100. Data sources 100 may include any number of data sources. For example, data sources 100 may include one data source (e.g., data source 100A) or multiple data sources (e.g., 100A-100N). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of temperature sensors positioned in an environment to collect temperature measurements according to a data collection schedule. Data sources 100 may be associated with a data pipeline and, therefore, may collect the temperature measurements, may perform processes to sort, organize, format, and/or otherwise prepare the data for future processing in the data pipeline, and/or may provide the data to other data processing systems in the data pipeline (e.g., via one or more application programming interfaces (APIs)).

Data sources 100 may provide data to data repository 102. Data repository 102 may include any number of data processing systems including hardware and/or software components configured to facilitate performance of the computer-implemented services. Data repository 102 may include a database (e.g., a data lake, a data warehouse, etc.) to store data obtained from data sources 100 (and/or other entities throughout a distributed environment).

Data repository 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services.

Continuing with the above example, data repository 102 may obtain the temperature measurements from data sources 100 as part of the data pipeline. Data repository 102 may obtain the temperature measurements via a request through an API and/or via other methods. Data repository 102 may curate the temperature data (e.g., identify errors/omissions and correct them, etc.) and may store the curated temperature data temporarily and/or permanently in a data lake or other storage architecture. Following curating the temperature data, data repository 102 may provide the temperature measurements to other entities for use in performing the computer-implemented services.

Data stored in data repository 102 may be provided to downstream consumers 104. Downstream consumers 104 may utilize the data from data sources 100 and/or data repository 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

Continuing with the above example, downstream consumers 104 may utilize the temperature data from data repository 102 as input data for climate models. Specifically, downstream consumers 104 may utilize the temperature data to simulate future temperature conditions in various environments over time (e.g., to predict weather patterns, climate change, etc.).

Over time, new data from data sources 100 (which may be updated over time to include new data sources) may become available. For example, data sources 100 may be updated to include new/additional sensors and/or other data generation elements. The new data provided by data sources 100 may be usable for a variety of tasks by downstream consumers 104, and/or the data pipeline.

For example, the data pipeline may include inference models (e.g., trained machine learning models) and/or other generative elements. These generative elements may use existing data from the data pipeline. When new data becomes available, the new data may be relevant for achieving goals for which the generative elements are used to attempt to achieve.

However, determining whether the new data is useful for achieving various goals may not be obvious from the new data itself. The generative processes performed using existing data may not be readily evaluated to ascertain whether the new data is useful for achieving the goals. For example, if a generative element is implemented using an inference model that ingests data corresponding to numerous features, it may be unclear whether the inference model may provide more desirable inferences if the new data is used as a basis for the inferences.

In general, embodiments disclosed herein may provide methods, systems, and/or devices for integrating use of new data into data pipelines in a manner that reduces friction to use of the new data. To integrate use of the new data, the data pipeline may automatically identify when new data is available to the data pipeline.

When new data is available, a graphical user interface may be used to present information regarding the new data, and potential uses for the new data to users. The users may provide user input regarding the potential uses for the new data.

Based on the user input, the data pipeline may automatically instantiate a shadow pipe based on an existing pipe of the data pipeline. The shadow pipe may not be visible or otherwise usable by users (e.g., downstream consumers 104) of data managed by the data pipeline. Refer to FIGS. 2A-2D for additional details regarding shadow pipe.

After instantiation, performance of the shadow pipe may be automatically evaluated and quantified. The evaluation and quantification may then be compared to similar evaluation and quantification of the existing pipe of the data pipeline. If positively compared with the existing pipe, operation of the data pipeline may be updated based on the shadow pipe. Refer to FIG. 2E for additional details regarding evaluation of the shadow pipe.

In this manner, use of new data as part of a data pipeline may be integrated while limiting friction. For example, automatic instantiation and evaluation of the shadow pipe may reduce a cognitive burden on users of the data pipeline. Accordingly, the operation of the data pipeline may be more likely to be updated as new data becomes available for use in the pipeline. Consequently, the operation of the data pipeline may be more likely to be based on data from newer sources.

Figure 2A:
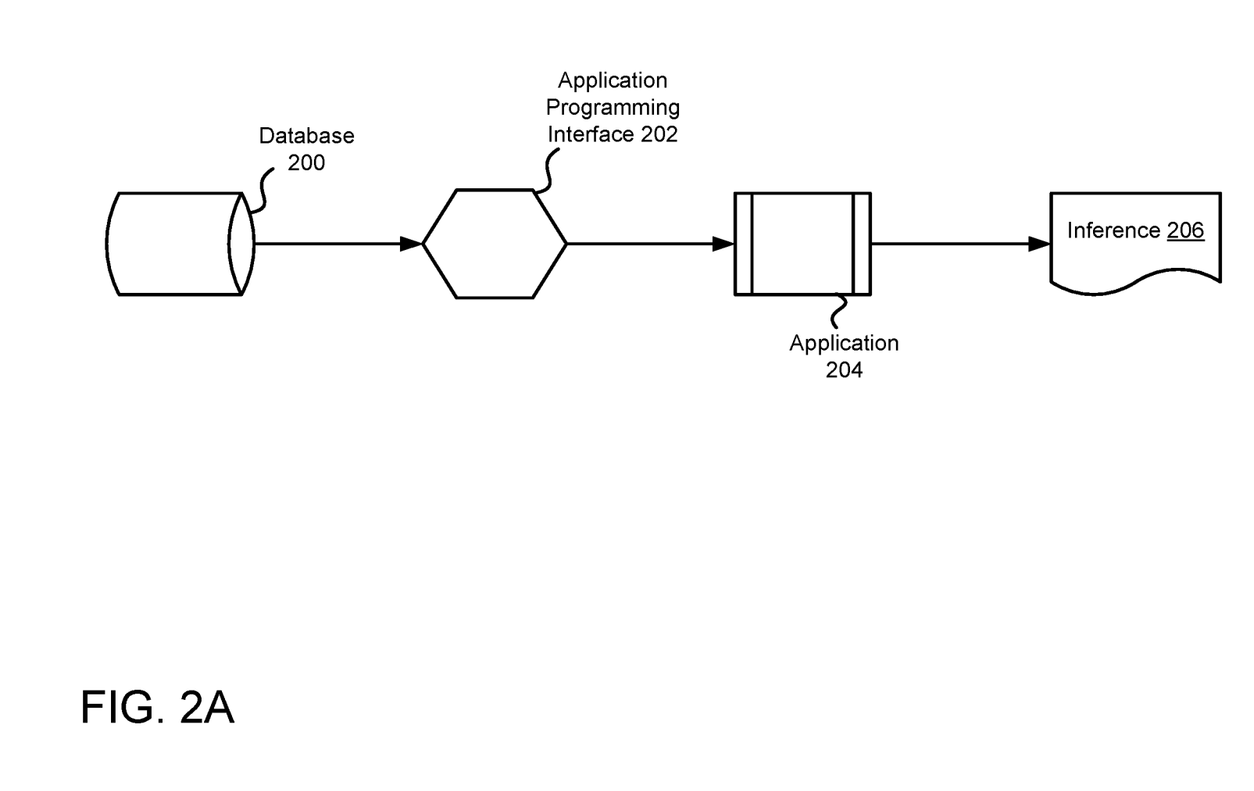
FIGS. 2A-2B and 2D-2E show block diagrams illustrating data flows in accordance with an embodiment.
Figure 2B:
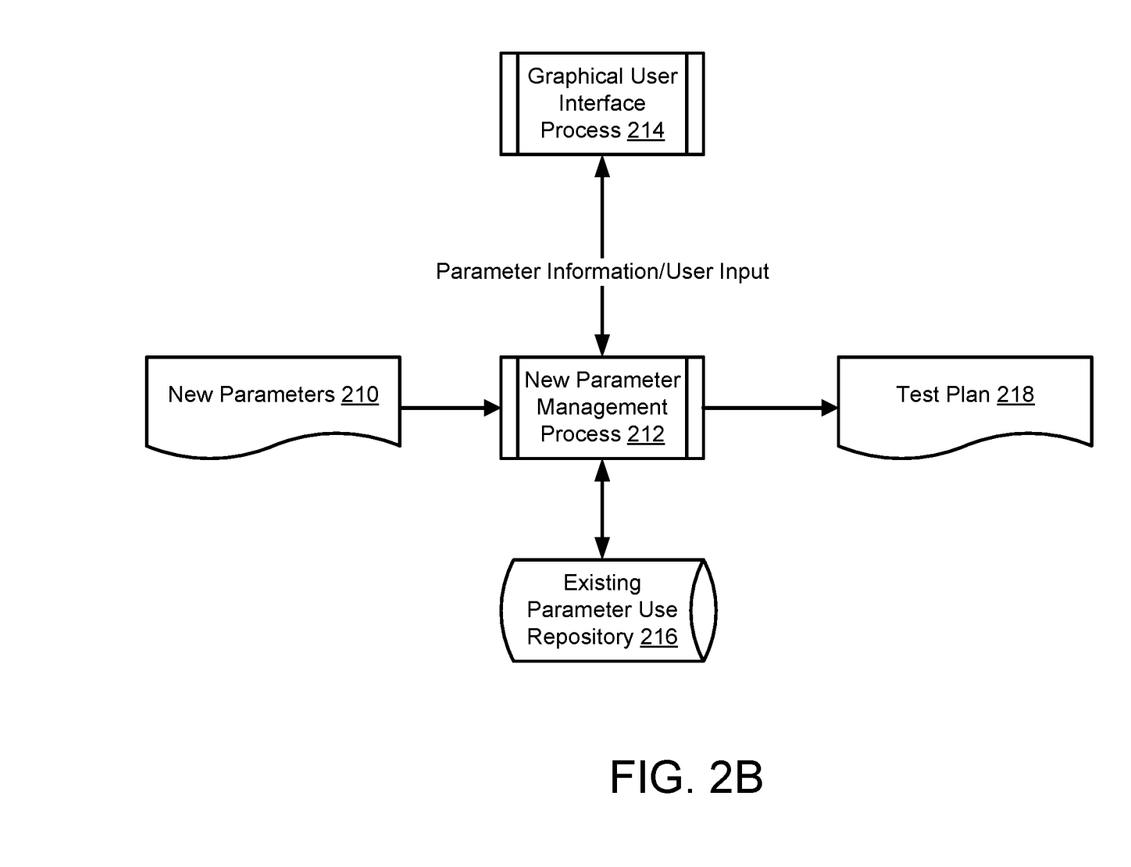
Figure 2C:
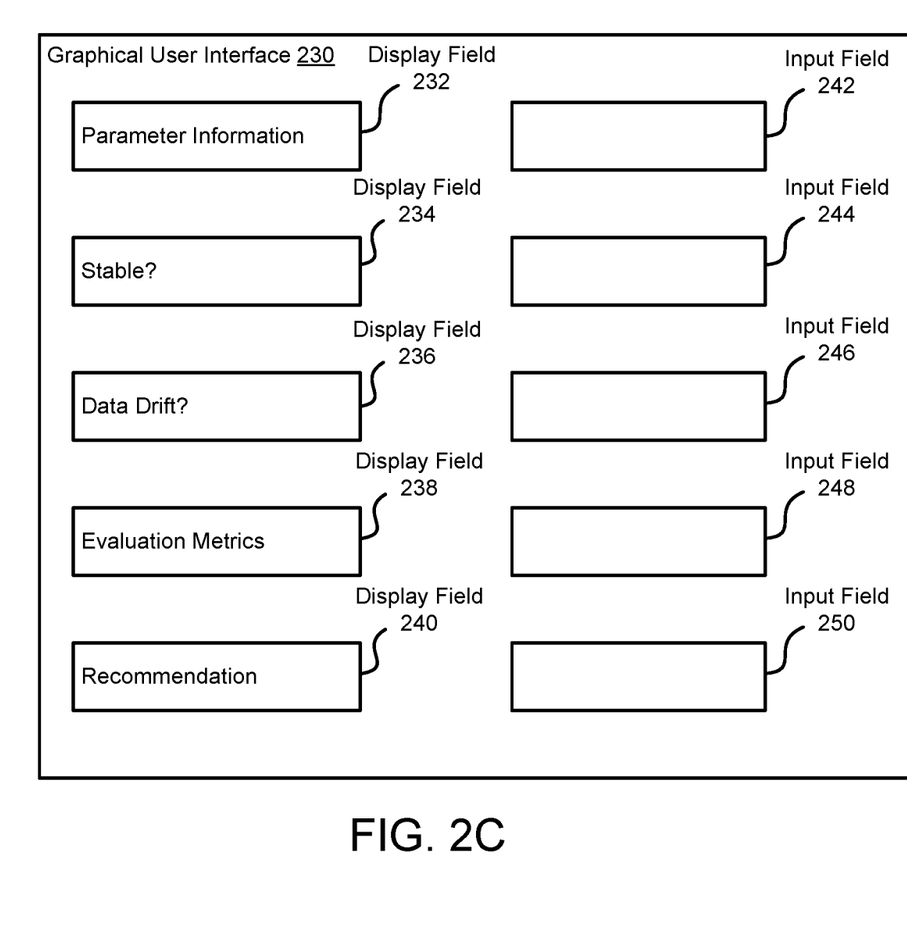
FIG. 2C shows a diagram of a graphical user interface in accordance with an embodiment.
Figure 2D:
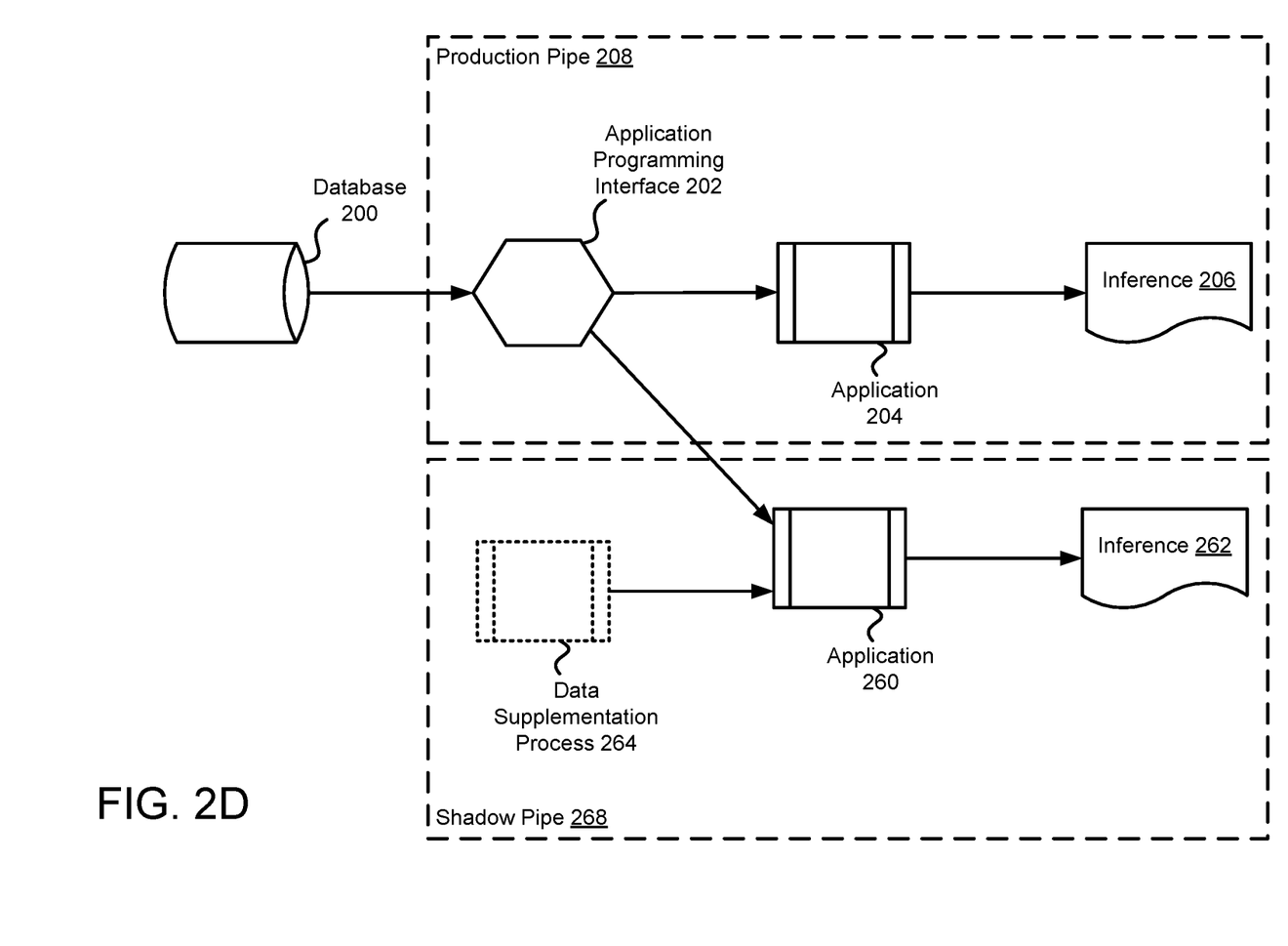
Figure 2E:
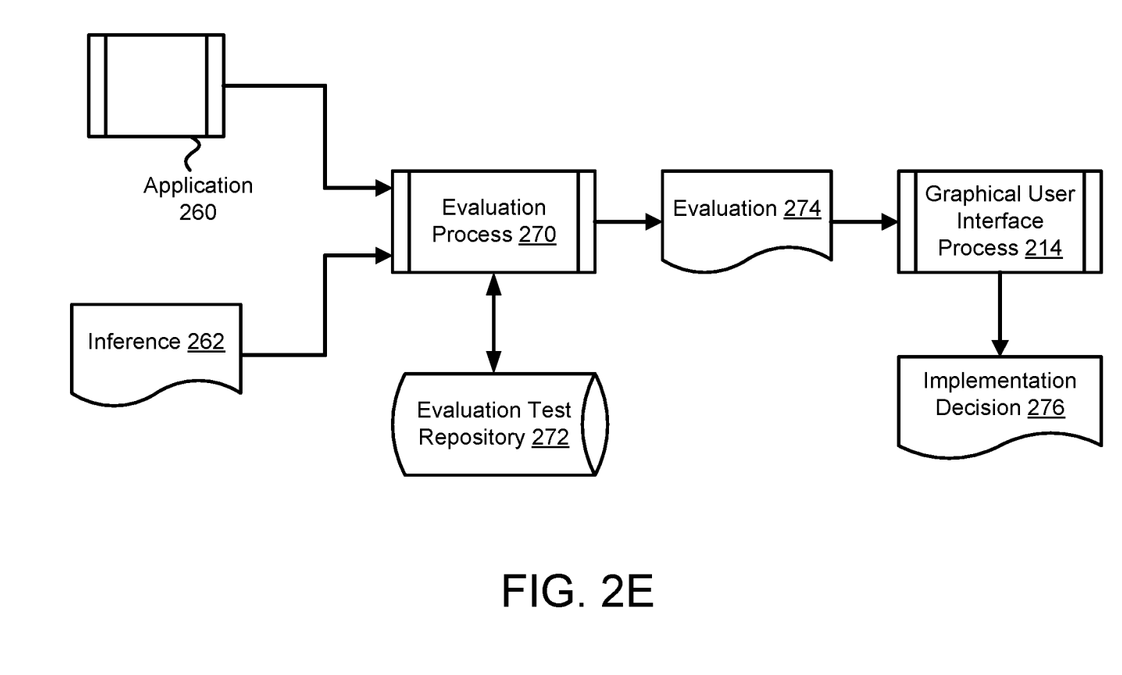
Figure 3:
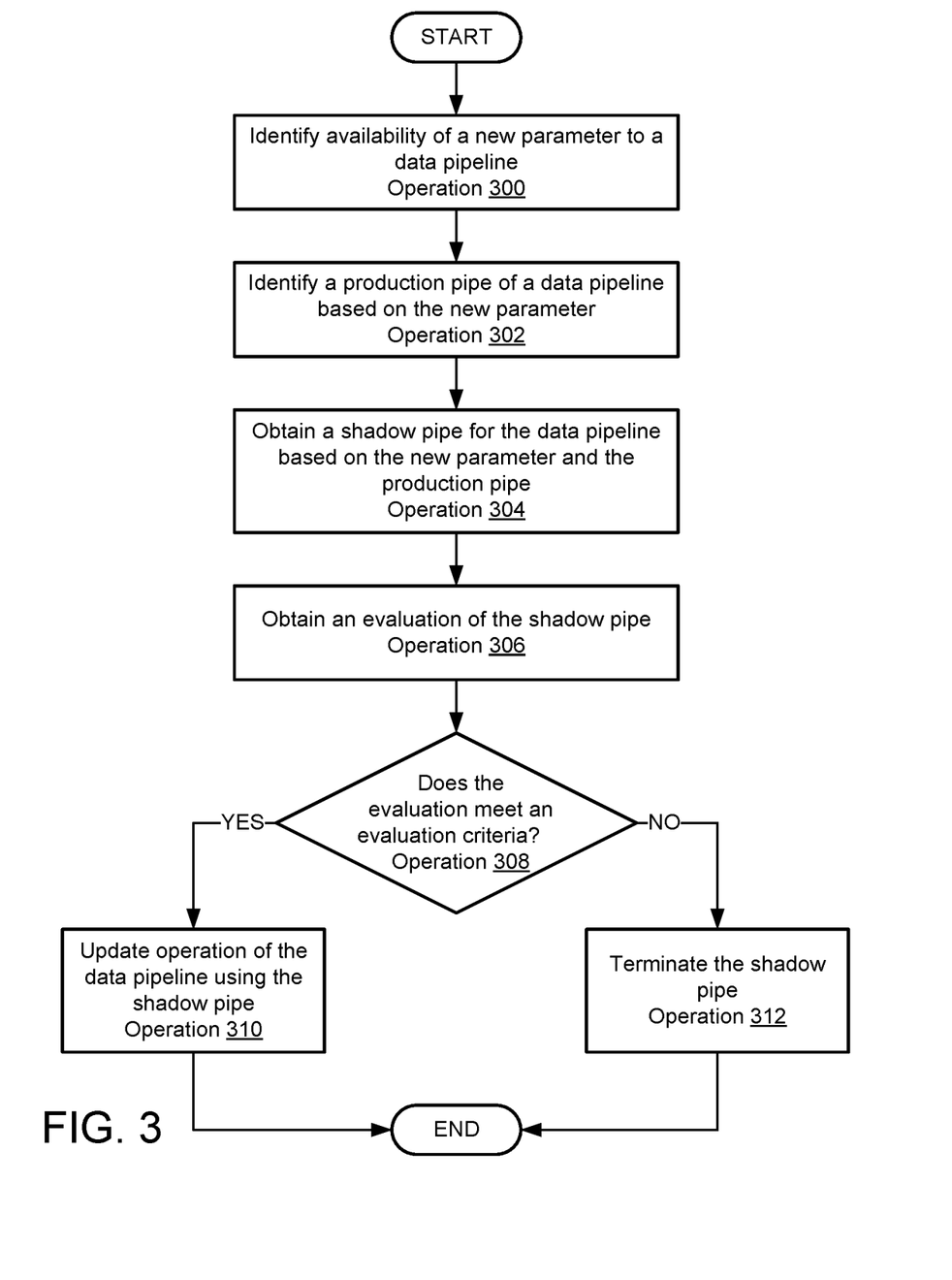
FIG. 3 shows a flow diagram illustrating a method in accordance with an embodiment.

When performing its functionality, data sources 100, data repository 102, and/or downstream consumers 104 may perform all, or a portion, of the methods and/or actions shown in FIG. 2A-3.

Data sources 100, data repository 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, one or more of data sources 100, data repository 102, and/or downstream consumers 104 are implemented using an internet of things (IoT) device, which may include a computing device. The IoT device may operate in accordance with a communication model and/or management model known to data sources 100, data repository 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows and/or processes performed in a system in accordance with an embodiment are shown in FIGS. 2A, 2B, 2D, and 2E, and an example graphical user interface that may be used in the data flows and/or processes is shown in FIG. 2C.

Turning to FIG. 2A, a first data flow diagram in accordance with an embodiments is shown. The first data flow diagram may illustrate a flow of data in an example portion of a data pipeline. The example portion of the data pipeline may include database 200, application programming interface 202, and application 204. Each of these components are discussed below.

Database 200 may include data populated by any number of processes performed by any number of devices. Database 200 may include any type and quantity of information.

Application programming interface 202 may provide access to the data in database 200 to application 204. Application programming interface 202 may be implemented using a software interface that facilitate access to data. API 202 may operate in accordance with a set of rules and may present an end point through which other entities may communicate with it. By sending information in accordance with the set of rules (e.g., a call) to the endpoint, application 204 may invoke functionality of API 202, including access to information stored in database 200.

For example, issuing a call to API 202 may cause API 202 to retrieve certain data from database 200 and provide a copy of it in a particular format to application 204 via any mechanism.

Application 204 may be a generative element such as a trained neural network that ingests data provided by API 202 and outputs interferences (e.g., 206) based on the ingested data. The trained neural network may have been trained using training data. Depending on how the training is performed, the trained neural network may ingest different types and/or quantities of data and output corresponding inferences (e.g., which may be predictions of some quantity defined by relationships present in the training data). Further, the quality (e.g., accuracy, level of uncertainty, etc.) of inferences produced by application 204 may depend on the type, quality, and quantity of the training data. While described with respect to a trained neural network, it will be appreciated that application 204 may be implemented using any type of generative entity (e.g., deep learning algorithms, large language models, etc.), classification process (e.g., decision trees, clustering algorithms, etc.), or other type of data processing (e.g., regression) through which additional data may be generated using the new data.

Inference 206 may be a data structure that may include any type and quantity of information. The utility of inference 206 may vary depending on the ability of application 204 to generate inferences of varying accuracy. The utility of inference 206 may be improved by improving the training data on which application 204 is based. Various downstream consumers may utilize inference 206, and the ability of the downstream consumers to effectively use inference 206 may depend on the quality of inference 206.

Overtime, the types and quantity of data added to database 200 may change. For example, as sensors used to obtain some of the data added to database 200 are upgraded, the measurements provided by the upgraded sensors may improve. Thus, the total data upon which inferences may be generated may change over time. Accordingly, application 204 may become stale due to application 204 only taking into account a limited type and quantity of data that is made available over time.

Further, over time API 202 may be updated to facilitate access to the expanded type and quantity of data in database 200. For example, when new data is populated to database 200 (e.g., such as in a sensor scenario, a new sensor may provide both a value representing a measurement but also another measurement indicating a likely amount of error in the measurement), API 202 may eventually be updated to facilitate access to the data.

To facilitate integration of new data into the data pipeline, the data sources, databases, and APIs of a data pipeline may be monitored for changes in available data. The monitoring may be performed via any mechanism (e.g., anomaly detection, API misalignment detection, etc.). When new data (e.g., new parameters) is identified as being available for use in the data pipeline, the data may be evaluated for potential use by downstream components in the data pipeline.

Turning to FIG. 2B, a second data flow diagram in accordance with an embodiment is shown. The second data flow diagram may illustrate data used in and processes performed to evaluate use of new data in data pipelines.

To evaluate use of new data, new parameters 210 from the data may be identified and ingested by new parameter management process 212. During new parameter management process 212, new parameters 210 may be analyzed to develop test plan 218. Test plan 218 may define a process for testing relevancy of new parameters 210 for use in existing processes as part of a data pipeline.

To evaluate new parameters 210, use of similar parameters in existing processes may be evaluated. Information regarding use of existing parameters may be stored in existing parameter use repository 216. For example, existing parameter use repository 216 may specify features of existing inference models used to generate data as part of a data pipeline. Information regarding the features, and goals of the models may be used to ascertain whether any of new parameters 210 may be relevant for use in the existing uses of the parameters.

Information regarding the new parameters and/or potential uses of the new parameters may be used to drive graphical user interface process 214. Graphical user interface process 214 may use the information to generate and display a graphical user interface to a user. The graphical user interface may present information regarding the new parameters and potential uses of the new parameters, and may solicit user input regarding the new parameters and potential uses of the new parameters. The user input may be used with the new parameters and potential uses to establish test plan 218. Refer to FIG. 2E for additional details regarding graphical user interface process 214.

Test plan 218 may be a process for (i) establishing a shadow pipe, and (ii) evaluating the shadow pipe. For example, test plan 218 may specify new instances of applications and inferences to be generated to evaluate whether new parameters 210 may be useful for various processes performed by a data pipeline.

For example, if any of new parameters 210 are found relevant to any of the existing parameters uses, then the existing uses may be used as a template for the shadow pipe. The existing uses may be implemented using production pipes, which may serve as templates on which corresponding test plans are patterned.

Once identified, test plan 218 may be used to establish a shadow pipe. However, to establish test plan 218 information from a user may be obtained using a graphical user interface.

Turning to FIG. 2C, a diagram of an example graphical user interface 230 in accordance with an embodiment is shown. Graphical user interface 230 may be presented to a user via a personal computing device, or other type of data processing system. The data processing system may host an agent or other entity that cooperates with the data pipeline to present information regarding new parameters, and obtain user input to manage integration of the new parameters into the data pipeline. To do so, graphical user interface 230 may include any number of display fields (e.g., 232-240) and input fields (e.g., 242-250).

Display fields may be portions of graphical user interface 230 where information is displayed for review by a user. Input fields 242 may be interactive portions of the graphical user interface where the user may provide user feedback. Some display fields and input fields may be positioned to cause a user to associate the input fields with corresponding display fields.

For example, graphical user interface 230 may include display field 232, where information regarding a new parameter is displayed. The information may include from where (e.g., a source) the new parameter is available, the content of the parameter, and/or other information. Input field 242 may be positioned with display field 232 and solicit user input indicate that the displayed information in display field 232 is accurate and/or to facilitate correction of the information.

Display field 234 may prompt the user to indicate whether the user believes that a parameter is likely to be stable. For example, display field 234 may solicit feedback from the user regarding how frequently the user believes values for the parameters are likely to be available (e.g., will a data source that supplies the parameter be a continuous source of new data for the parameter, and intermittent source, etc.). Input field 244 may be positioned with display field 234 to allow the user to provide user input regarding whether the parameter is stable.

Display field 236 may prompt the user to indicate whether the user believes that the parameter likely represent an occurrence of a data drift. For example, replacement of a sensor may be an occurrence of a data drift event. Input field 246 may be positioned with display field 236 to allow the user to provide user input regarding whether a data drift has occurred.

Display field 238 may prompt the user to select evaluation metrics for the parameter. For example, potential metrics may be provided in display field 238. Input field 248 may be positioned with display field 238 to allow the user to provide user input regarding which evaluation metrics are to be used.

Display field 240 may provide information to the user regarding how the new parameter performed in testing under the selected evaluation metrics. Refer to FIG. 2E for additional details regarding evaluation of the new parameters under selected evaluation metrics. Input field 250 may be positioned with display field 240 to allow the user to provide user input regarding whether to incorporate use of a shadow pipe that uses the new parameters into operation of the data pipeline.

The input fields may solicit input using any modality. For example, the input fields may be implemented using text boxes, using radio buttons, and/or using other types of widgets/interface elements.

The content of display fields 232-240 and input fields 242-250 may be dynamically updated over time. For example, once user feedback has been provided to input fields 242-246 (and/or 248), a shadow pipe may be established and evaluated. The results of the evaluation may be used to update display field 240 which may then allow for user input to be provided via input field 250 to either elect to either integrate or discard the shadow pipe. Refer to FIG. 2D for additional details regarding implementation of a shadow pipe, and FIG. 2E for additional details regarding evaluation of a shadow pipe.

While graphical user interface 230 has been illustrated using specific numbers and types of elements, it will be appreciated that graphical user interfaces may include additional, different, and/or fewer elements without departing from embodiments disclosed herein.

Turning to FIG. 2D, a third data flow diagram in accordance with an embodiment is shown. The third data flow diagram may illustrate data used in and processes performed to establish a shadow pipe.

As discussed with respect to FIG. 2B, a test plan may define how a shadow pipe (e.g., 268) is to be established. The test plan may be based on an existing production pipe (e.g., 208).

To establish shadow pipe 268, application 260 to be instantiated. Application 260 may be an inference model similar to application 204. However, in contrast to application 204, application 260 may be trained using training data used to train application 204 and/or the new parameters that initiated establishment of the test plan.

The content of the training data may be defined based on the user input regarding whether a data drift has occurred. If the user input indicates an occurrence of the data drift, then the training data may only include data obtained after the occurrence of the data drift (e.g., the date when the new parameter/data becomes available). In contrast, if the user input indicates that the new parameter does not indicate occurrence of a data drift, then the training data may include data regardless of its date (e.g., before or after when the new parameter/data becomes available).

For example, if application 204 is trained using historic data regarding operation of an assembly line that defines a relationship between measurement of light reflected off of the line and number of items produced on the line, and the new parameter is an error rate level in the measurement of the light reflected off of the line due to the sensor that captures the measurement being replaced, then the training data used to train application 260 may be relationships between the measured light and error in the measurement versus the number of items produced on the line. Further, if the user input indicates that a data drift has occurred due to the new parameter, then only measurements of the light, error in the measurement, and number of items produced on the line after replacement of the sensor may be included in the training data. However, if the user input indicates that a data drift has not occurred due to the new parameter, then measurements of the light, error in the measurement, and number of items produced on the line may be included in the training data regardless of when the data is collected (e.g., before/after sensor replacement).

The resulting application 260 may produce inference 262 which may be more or less useful than inference 206 for uses of the inferences. For example, both inferences may be predictions for the same quantity, but may be more or less useful depending on how useful the new parameter is in predicting the quantity (in this example, number of items produced by the line). Refer to FIG. 2E for additional details regarding evaluation of the utility of inference 262.

In addition to application 260, data supplementation process 264 may also be instantiated as the user input regarding the stability of the new parameter indicates that the parameter was likely to be unstable. In other words, if the sources of the data was likely to only supply the data intermittently or otherwise not in accordance with when it will be needed. In the case of the assembly line example, this could be needed continuously.

Data supplementation process 264 may supplement the data available from the data source. For example, data supplementation process 264 may be implemented using a generative process that predicts values that would be provided by the data source over time. Consequently, data supplementation process 264 may provide values for the new parameter while the data source is unable to supply values for a particular period of time.

For example, returning to the assembly line example, if the data source is a sensor, data supplementation process 264 may be implemented using a trained neural network (or other inference model) that has weights adapted to predict values measured by the sensor over time. Consequently, if data from the sensor is not available, the predictions provided by data supplementation process 264 may be used to complete the input data needed for application 260 to generate inference 262.

Once inferences (e.g., 262) are obtained, shadow pipe 268 may be evaluated.

Turning to FIG. 2E, a fourth data flow diagram in accordance with an embodiment is shown. The fourth data flow diagram may illustrate data used in and processes performed to evaluate utility of a shadow pipe.

To evaluate utility of the shadow pipe, application 260 and/or inference 262 may be ingested by evaluation process 270. During evaluation process 270, any number of tests may be performed. The tests may be defined by the user input proved via the graphical user interface shown in FIG. 2C regarding the evaluation metrics that are to be used. For example, the valuation metrics may define how the shadow pipe is to be evaluated in terms of (i) predictive performance (e.g., accuracy, and/or other metrics) of inferences generated by application 260, (ii) the uncertainty of the inferences, (iii) the level of dependency on the features of application 260 in the inferences (e.g., may be evaluated using Shap value analysis or other feature importance evaluation processes), and/or other metrics identified by the user input.

For example, the user input may indicate a desired level of accuracy, a maximum level of uncertainty, maximum levels of dependency on features (e.g., no feature may contribute more than a threshold amount to inferences produced by application 260, no feature may contribute less than a threshold amount to inferences, etc.), etc.

Various testing procedures corresponding the evaluation criteria may be stored in evaluation test repository 272. Evaluation process 270 may use the procedures included in evaluation test repository 272 as specified by the user input to evaluate the shadow pipe.

Evaluation process 270 may produce evaluation 274. Evaluation 274 may be a data structure that includes information regarding the evaluation of the shadow pipe. For example, evaluation 274 may specify results of various evaluation procedures, comparison to user supplied evaluation metrics, and/or a recommendation based on the metrics.

Evaluation 274 may be ingested by graphical user interface process 214 to present information regarding the evaluation of the shadow pipe to a user, and to solicit user feedback regarding whether to integrate the shadow pipe into the data pipeline. Prior to integration, existing of the shadow pipe may be kept secret, shrouded, and/or otherwise obscured from downstream users of the data pipeline.

The solicited user input may be an implementation decision 276. If the implementation decision indicates integration, the shadow pipe may be integrated into the data pipeline. For example, the shadow pipe may be converted into a new production pipe and/or may replace the existing production pipe on which the shadow pipe is based.

If the implementation decision indicates that the shadow pipe is not to be integrated, then the shadow pipe may be terminated.

As discussed above, the components of FIG. 1 may perform various methods to manage operation of data processing systems throughout a distributed environment. FIG. 3 illustrate a method that may be performed by the components of FIG. 1. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of managing a data pipeline in accordance with an embodiment is shown. The method may be performed, for example, by a data source, data repository, downstream consumer, and/or any other entity.

At operation 300, availability of a new parameter to a data pipeline is identified. The availability may be identified by monitoring operation of components of the data pipeline. For example, application programming interfaces may be monitored to identify availability of new data. Similarly, databases may be monitored for new types of data added to the databases. The new parameter may be any type of data for which values are expected to be updated over time.

At operation 302, a production pipe of a data pipeline is identified based on the new parameter. The production pipe may be identified by displaying, using a graphical user interface, information regarding the new parameter to a user; and obtaining, using the graphical user interface, first user input confirming that the new parameter is relevant to the production pipe. For example, the graphical user interface may include a display field in which potential production pipes to which the new parameter may be relevant. The potential production pipes may be identified by matching the type of the new parameter to similar parameters used by the potential production pipes. The user input may indicate approval and/or disapproval of the potential production pipes. The approved potential production pipes may be identified production pipes.

At operation 304, a shadow pipe for the data pipeline may be obtained based on the new parameter and the production pipe. The shadow pipe may be obtained by obtaining, using the graphical user interface, second user input indicating whether the new parameter is stable; obtaining, using the graphical user interface, third user input indicating whether the new parameter signifies an occurrence of data drift in the production pipe; and instantiating an inference model for the shadow pipe. The graphical user interface may be similar to that shown in FIG. 2C. The inference model may be instantiated by training an inference model using training data selected based on whether the third user input indicates that data drift as occurred.

The shadow pipe may also be obtained by instantiating a value supplementer to provide values for the new parameter when a source of values for the new parameter is unable to supply values for the new parameter.

At operation 306, an evaluation of the shadow pipe is obtained. The evaluation may be obtained by performing one or more evaluation processes to obtain quantifications, and comparing the quantifications to thresholds or other criteria. The evaluation processes may include generating an inference using the shadow pipe. The inference may then be evaluated for accuracy, uncertainty, etc. The accuracy, uncertainty, and/or other characteristics of the inference may be valuation metrics used to judge the utility of the shadow pipe.

The evaluation may also be obtained by interrogating inference models of the shadow pipe. For example, contribution levels of features of the inference models may be compared to threshold levels or ranges to ascertain whether they are acceptable. The acceptability of the contribution levels may be evaluation metrics used to judge the utility of the shadow pipe.

The evaluation metrics may be presented to a user using the graphical user interface, and user input indicating acceptability of the utility of the shadow pipe may be received via the graphical user interface.

At operation 308, a determination is made regarding whether the evaluation meets an evaluation criteria. The determination may be made by presenting the evaluation metrics to the user and using the feedback as whether the valuation meets the evaluation criteria. In other words, a user may use the evaluation metrics to decide whether the evaluation meets the evaluation criteria. However, automated methods of making the determination may be used as well (and/or semi-automated methods). For example, the evaluation metrics may be compared to thresholds or other criteria that discriminate acceptable from unacceptable shadow pipes.

If the evaluation meets the evaluation criteria, then the method may proceed to operation 310. Otherwise, the method may proceed to operation 312.

At operation 310, operation of the data pipeline is updated using the shadow pipe. The updated data pipeline may be used to provide computer implemented services. The operation may be updated by converting the shadow pipe to a production pipe, or replacing an existing production pipe with the shadow pipe.

The method may end following operation 310.

Returning to operation 308, the method may proceed to operation 312 following operation 308 when the evaluation does not meet the evaluation criteria.

At operation 312, the shadow pipe is terminated. The shadow pipe may be terminated by suspending or terminating operation of components of the shadow pipe.

The method may end following operation 312.

Thus, using the method illustrated in FIG. 3, new data available for use in data pipelines may be integrated into use by the data pipeline. The new data may be implemented using automated processes that reduce the cognitive burden on users for identify utility of the new data.

Figure 4:
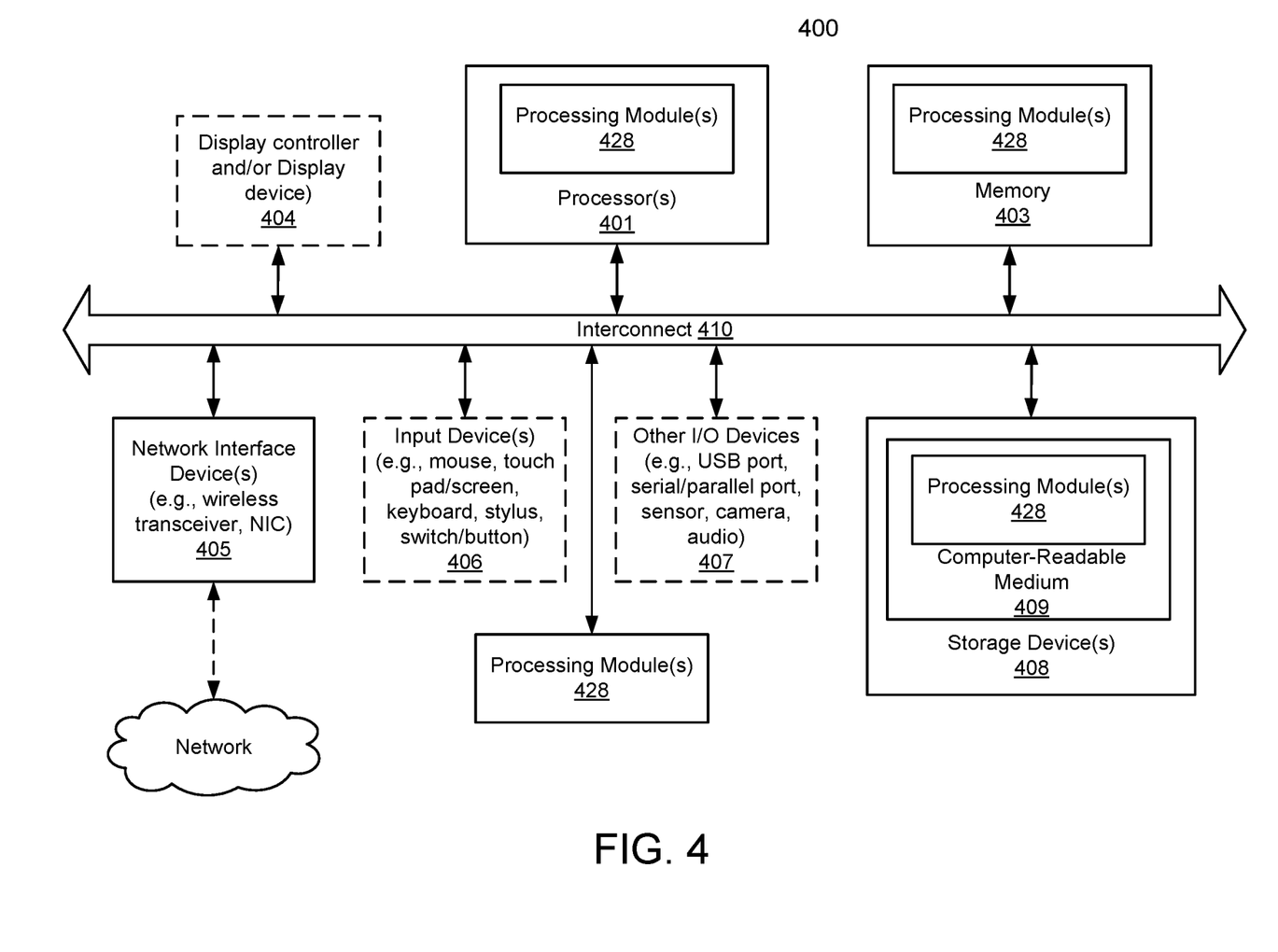
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor

401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data pipeline, the method comprising:
   identifying availability of a new parameter to the data pipeline;
   identifying a production pipe of the data pipeline based on the new parameter;
   obtaining a shadow pipe for the data pipeline based at least in part on the new parameter, and the production pipe;
   in an instance of the obtaining of the shadow pipe where the new parameter is not stable, instantiating a value supplementer adapted to supplement the new parameter during periods of time where values for the new parameter are unavailable;
   obtaining an evaluation of the shadow pipe;
   making a determination regarding whether the evaluation meets an evaluation criteria;
   in a first instance of the determination where the evaluation meets the evaluation criteria:
   updating operation of the data pipeline using the shadow pipe to obtain an updated data pipeline, and providing computer implemented services using the updated data pipeline; and in a second instance of the determination where the evaluation does not meet the evaluation criteria:

terminating the shadow pipe to retain the data pipeline, and providing the computer implemented services using the data pipeline.

2. The method of claim 1, wherein identifying the production pipe comprises:

displaying, using a graphical user interface, information regarding the new parameter to a user; and obtaining, using the graphical user interface, first user input confirming that the new parameter is relevant to the production pipe.

3. The method of claim 2, wherein obtaining the shadow pipe comprises:

obtaining, using the graphical user interface, second user input indicating whether the new parameter is stable;

obtaining, using the graphical user interface, third user input indicating whether the new parameter signifies an occurrence of data drift in the production pipe; and instantiating an inference model for the shadow pipe.

4. The method of claim 1, wherein the value supplementer is a second inference model that is trained to predict the values for the new parameter.

5. The method of claim 3, wherein in a first instance of the third user input that indicates that the new parameter does not signify the occurrence of data drift, the inference model is trained using first training data that comprises historic data that is obtained prior to the occurrence of the data drift.

6. The method of claim 3, wherein in a second instance of the third user input that indicates that the new parameter does signify the occurrence of data drift, the inference model is trained using training data that does not comprise historic data that is obtained prior to the occurrence of the data drift.

7. The method of claim 2, wherein obtaining the evaluation of the shadow pipe comprises:

obtaining a first inference using a first inference model of the shadow pipe and a value for the new parameter; and obtaining a first evaluation metric using at least the inference.

8. The method of claim 7, wherein making the determination comprises:

obtaining a second evaluation metric using a second inference of the production pipe, the second inference and the first inference being predictions for a same quantity;

displaying, using the graphical user interface, information regarding the first evaluation metric and the second evaluation metric to a second user;

obtaining, using the graphical user interface, second user input from the second user, the second user input indicating whether the evaluation meets the evaluation criteria; and concluding whether the evaluation meets the evaluation criteria using the second user input.

9. A non-transitory medium having instructions stored therein, which when executed by a processor, cause the processor to perform operations for managing a data pipeline, the operations comprising:

identifying availability of a new parameter to the data pipeline;

identifying a production pipe of the data pipeline based on the new parameter;

obtaining a shadow pipe for the data pipeline based at least in part on the new parameter, and the production pipe;

in an instance of the obtaining of the shadow pipe where the new parameter is not stable, instantiating a value supplementer adapted to supplement the new parameter during periods of time where values for the new parameter are unavailable;

obtaining an evaluation of the shadow pipe;

making a determination regarding whether the evaluation meets an evaluation criteria;

in a first instance of the determination where the evaluation meets the evaluation criteria:

updating operation of the data pipeline using the shadow pipe to obtain an updated data pipeline, and providing computer implemented services using the updated data pipeline; and in a second instance of the determination where the evaluation does not meet the evaluation criteria:

terminating the shadow pipe to retain the data pipeline, and providing the computer implemented services using the data pipeline.

10. The non-transitory medium of claim 9, wherein identifying the production pipe comprises:

displaying, using a graphical user interface, information regarding the new parameter to a user; and obtaining, using the graphical user interface, first user input confirming that the new parameter is relevant to the production pipe.

11. The non-transitory medium of claim 10, wherein obtaining the shadow pipe comprises:

obtaining, using the graphical user interface, second user input indicating whether the new parameter is stable;

obtaining, using the graphical user interface, third user input indicating whether the new parameter signifies an occurrence of data drift in the production pipe; and instantiating an inference model for the shadow pipe.

12. The non-transitory medium of claim 9, wherein the value supplementer is a second inference model that is trained to predict the values for the new parameter.

13. The non-transitory medium of claim 11, wherein in a first instance of the third user input that indicates that the new parameter does not signify the occurrence of data drift, the inference model is trained using first training data that comprises historic data obtained prior to the occurrence of the data drift.

14. The non-transitory of claim 11, wherein in a first instance of the third user input that indicates that the new parameter does not signify the occurrence of data drift, the inference model is trained using first training data that comprises historic data that is obtained prior to the occurrence of the data drift.

15. The non-transitory of claim 11, wherein in a second instance of the third user input that indicates that the new parameter does signify the occurrence of data drift, the inference model is trained using training data that does not comprise historic data that is obtained prior to the occurrence of the data drift.

16. A data processing system, comprising:

a processor; and a memory coupled to the processor to store instructions, which when executed by the processor, cause the data processing system to perform operations for managing a data pipeline, the operations comprising:

identifying availability of a new parameter to the data pipeline;

identifying a production pipe of the data pipeline based on the new parameter;

obtaining a shadow pipe for the data pipeline based at least in part on the new parameter, and the production pipe;

in an instance of the obtaining of the shadow pipe where the new parameter is not stable, instantiating a value supplementer adapted to supplement the new parameter during periods of time where values for the new parameter are unavailable;

obtaining an evaluation of the shadow pipe;

making a determination regarding whether the evaluation meets an evaluation criteria;

in a first instance of the determination where the evaluation meets the evaluation criteria:
  updating operation of the data pipeline using the shadow pipe to obtain an updated data pipeline, and
  providing computer implemented services using the updated data pipeline; and in a second instance of the determination where the evaluation does not meet the evaluation criteria:
  terminating the shadow pipe to retain the data pipeline, and
  providing the computer implemented services using the data pipeline.

17. The data processing system of claim 16, wherein identifying the production pipe comprises:
  displaying, using a graphical user interface, information regarding the new parameter to a user; and
  obtaining, using the graphical user interface, first user input confirming that the new parameter is relevant to the production pipe.

18. The data processing system of claim 17, wherein obtaining the shadow pipe comprises:
  obtaining, using the graphical user interface, second user input indicating whether the new parameter is stable;
  obtaining, using the graphical user interface, third user input indicating whether the new parameter signifies an occurrence of data drift in the production pipe; and
  instantiating an inference model for the shadow pipe.

19. The data processing system of claim 16, wherein the value supplementer is a second inference model that is trained to predict the values for the new parameter.

20. The data processing system of claim 18, wherein in a first instance of the third user input that indicates that the new parameter does not signify the occurrence of data drift, the inference model is trained using first training data that comprises historic data that is obtained prior to the occurrence of the data drift.

* * * * *